US009661237B2

(12) United States Patent
Echigo

(10) Patent No.: US 9,661,237 B2
(45) Date of Patent: May 23, 2017

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Masanori Echigo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/881,736

(22) Filed: Oct. 13, 2015

(65) Prior Publication Data

US 2016/0112653 A1   Apr. 21, 2016

(30) Foreign Application Priority Data

Oct. 16, 2014   (JP) ................. 2014-211993

(51) Int. Cl.
| | | |
|---|---|---|
| *H04N 5/235* | (2006.01) | |
| *H04N 5/262* | (2006.01) | |
| *G06T 5/50* | (2006.01) | |
| *H04N 5/232* | (2006.01) | |

(52) U.S. Cl.
CPC ............ *H04N 5/2628* (2013.01); *G06T 5/50* (2013.01); *H04N 5/2355* (2013.01); *H04N 5/2356* (2013.01); *H04N 5/23212* (2013.01); *H04N 5/23293* (2013.01); *G06T 2207/10016* (2013.01); *G06T 2207/20208* (2013.01)

(58) Field of Classification Search
CPC ............ H04N 5/2628; H04N 5/2356; H04N 5/23212; H04N 5/23296; H04N 5/2355; G06T 5/50; G06T 2207/10016; G06T 2207/20208
See application file for complete search history.

(56) References Cited

U.S. PATENT DOCUMENTS

| | | | | |
|---|---|---|---|---|
| 2009/0309990 | A1* | 12/2009 | Levoy ................ | H04N 5/23212 348/222.1 |
| 2011/0176031 | A1* | 7/2011 | Liu ..................... | H04N 5/2356 348/229.1 |
| 2012/0249830 | A1* | 10/2012 | Tsubaki ............... | H04N 5/2353 348/229.1 |
| 2013/0286254 | A1* | 10/2013 | Watanabe ............ | H04N 5/2355 348/239 |

(Continued)

FOREIGN PATENT DOCUMENTS

| | | |
|---|---|---|
| JP | 2013-162420 A | 8/2013 |
| JP | 2014-014069 A | 1/2014 |

*Primary Examiner* — Jason Flohre
(74) *Attorney, Agent, or Firm* — Cowan, Liebowitz & Latman, P.C.

(57) ABSTRACT

An image capturing apparatus comprising: an image capturing unit configured to capture a plurality of images with different exposure amounts; an image compositing unit configured to composite the plurality of images and generate a composited image; and a display control unit configured to display the composited image generated by the image compositing unit on a display unit; wherein the display control unit performs control so that, in accordance with an instruction for magnifying a portion of the composited image displayed on the display unit, a magnified image of an image from among the plurality of images captured by the image capturing unit is displayed on the display unit instead of the composited image.

11 Claims, 9 Drawing Sheets

(56) References Cited

U.S. PATENT DOCUMENTS

2013/0329090 A1* 12/2013 Ise ................... H04N 5/2355
                                                    348/240.99
2014/0347519 A1* 11/2014 Yamamoto ............ H04N 5/235
                                                    348/231.99
2014/0354842 A1* 12/2014 Pflughaupt ......... H04N 5/23267
                                                    348/218.1

* cited by examiner

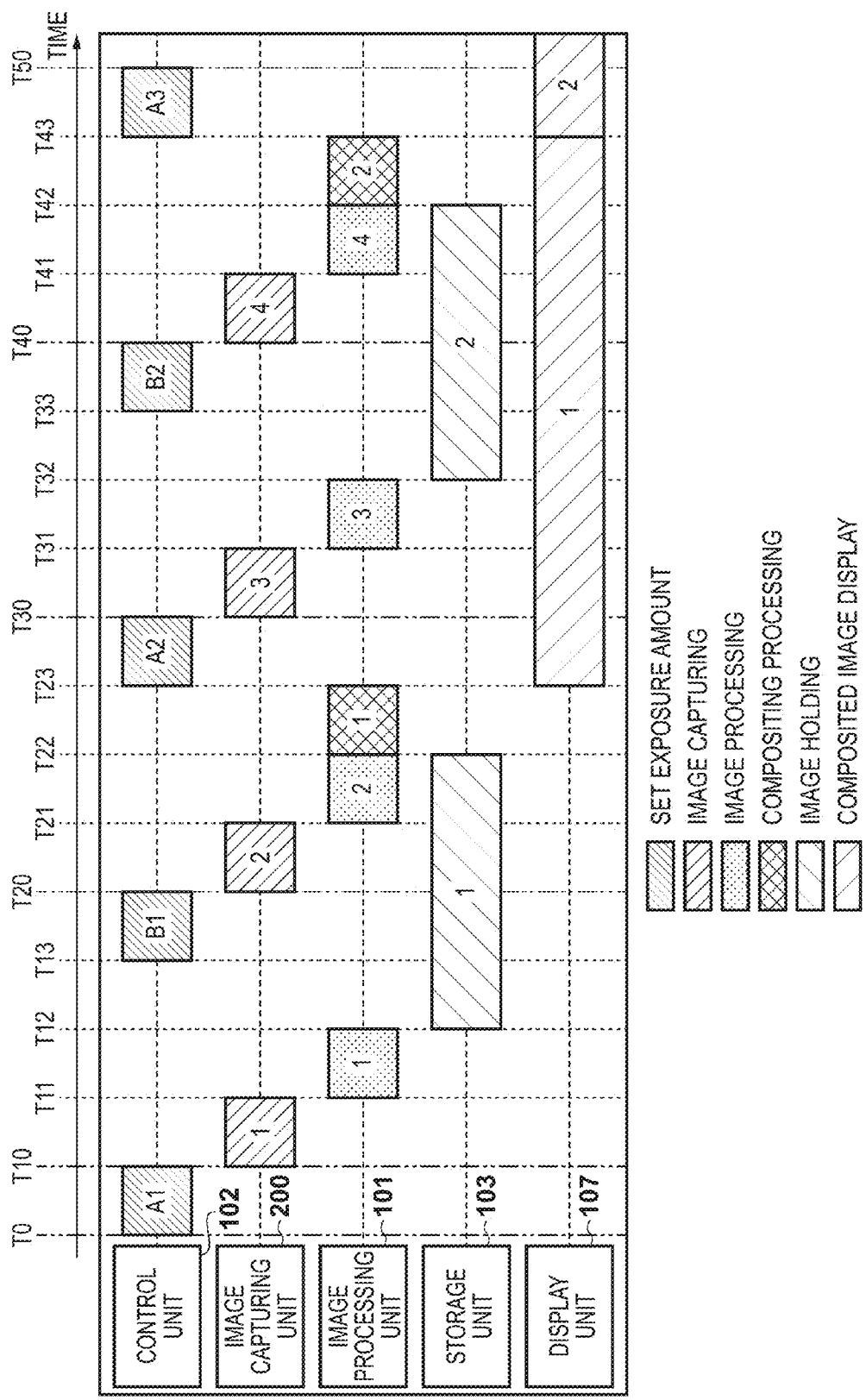

HIGH EXPOSURE IMAGE

LOW EXPOSURE IMAGE

HDR-COMPOSITED IMAGE

HDR-COMPOSITED IMAGE
(MAGNIFIED DISPLAY)

HDR-COMPOSITED IMAGE

HIGH EXPOSURE IMAGE
(MAGNIFIED DISPLAY)

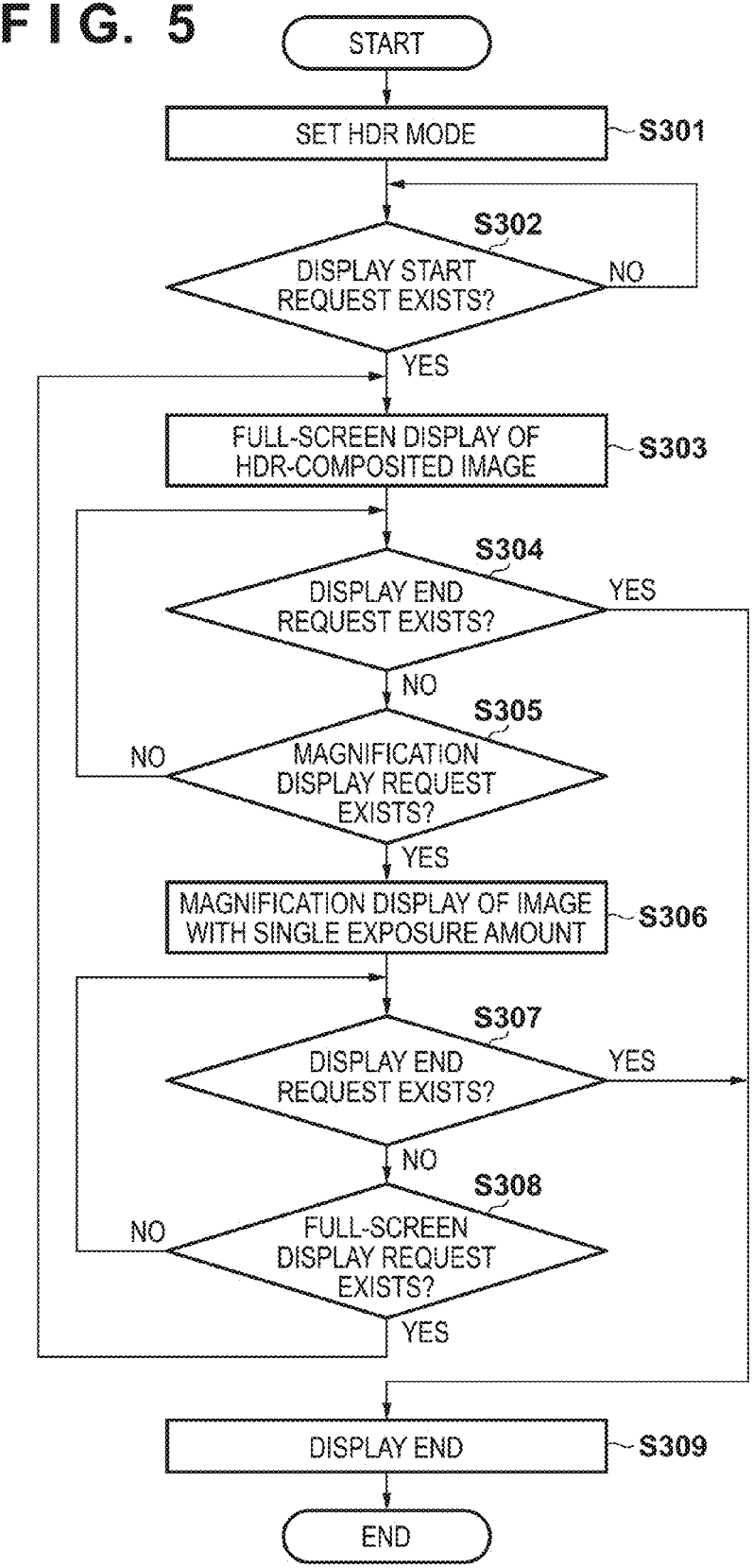

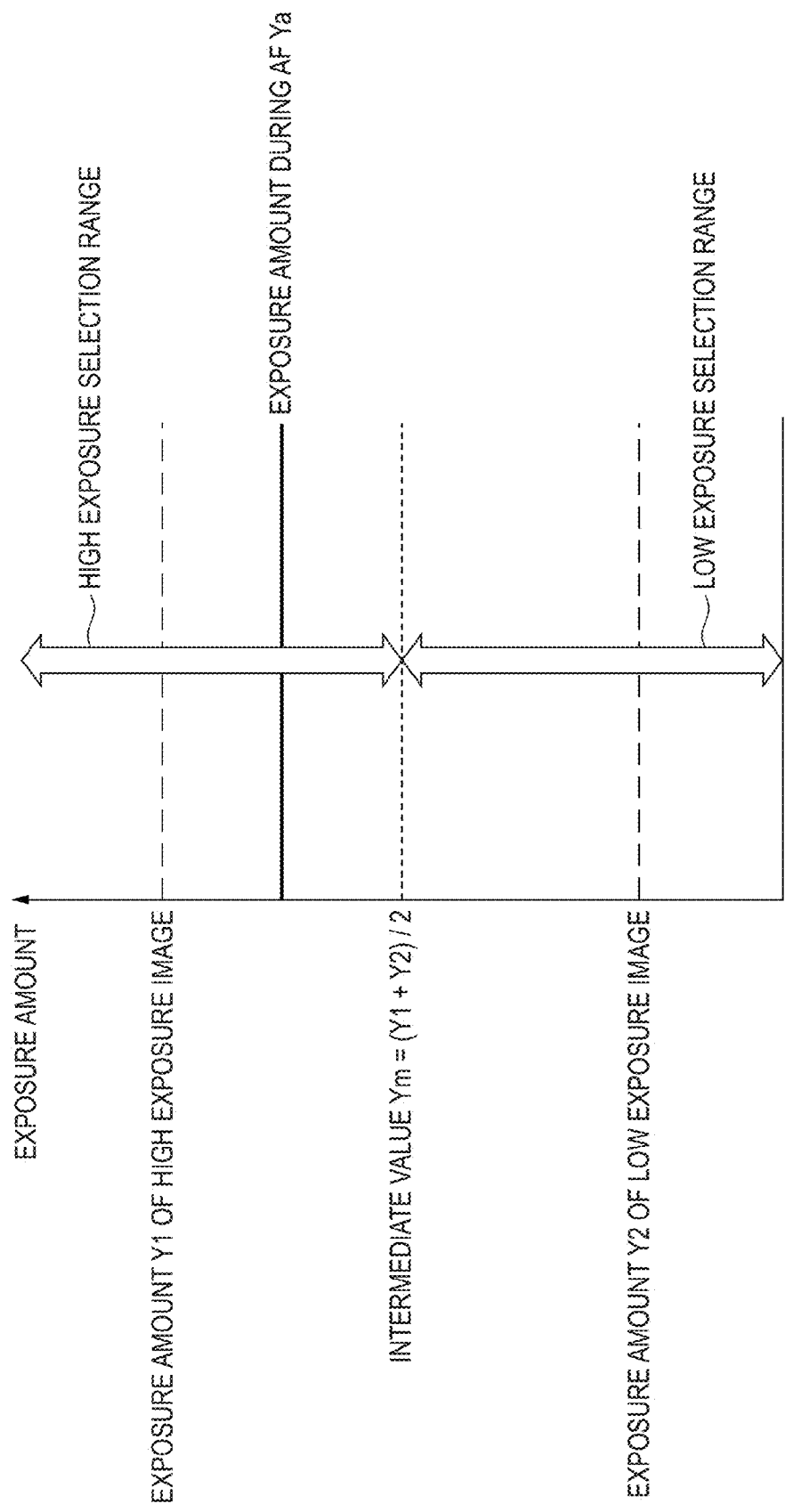

IMAGE CAPTURING APPARATUS, CONTROL METHOD THEREOF, AND STORAGE MEDIUM

BACKGROUND OF THE INVENTION

Field of the Invention

The present invention relates to an image capturing apparatus, a control method thereof, and a storage medium, and particularly to an image processing technology using high dynamic range (HDR) compositing.

Description of the Related Art

In recent years, there exist image capturing apparatuses equipped with various image capturing technologies. A high dynamic range (HDR) compositing technology is known which makes it possible to acquire an image having a broader dynamic range than a dynamic range acquired in one photographing operation by compositing a plurality of images acquired by photographing the same scene with varied exposure amounts. It is possible to acquire, by using the HDR compositing technology, an image in which blown-out highlights and crushed blacks in the shot image are suppressed.

A technology for live-view displaying or recording a moving image (HDR moving image) acquired by successively performing acquisition of composited images (HDR images) generated using this HDR compositing is also known. Because a plurality of images shot at different start timings and end timings are composited so as to generate one image, generation of the HDR moving image is likely to be influenced by change in the angle of view, camera shake or the like, and there are cases where the generated composited image is blurred. In order to address this, Japanese Patent Laid-Open No. 2014-14069 proposes a technology for suppressing blurring in a composited image during an optical zoom operation when shooting an HDR moving image.

Meanwhile, during live view display, a portion of an image is magnified and displayed in order to check the focus state. However, when magnifying the portion of the image, there are cases of display in which the focus check is difficult to perform due to a blown-out highlight state or the like, depending on the set shooting condition or the brightness of the object at the position to be magnified. To address this, Japanese Patent Laid-Open No. 2013-162420 proposes a technology for making it easy to check the focus state during live view display by providing an exposure control unit for magnification display and changing the image quality of the magnification display.

However, the above conventional technology is a technology for resolving image blurring during an optical zoom operation by outputting a non-composited image instead of an HDR image while changing the zoom magnification, and is not intended to resolve image blurring in magnification display during live view display. Moreover, the above conventional technology is a technology for changing the image quality in the magnification display during the live view display regarding a moving image that does not contain composited images, and magnification display while shooting a HDR moving image is not considered. Therefore, image blurring can occur during the magnification display, and moreover, the cost can increase because the exposure control unit dedicated to the magnification display is required.

SUMMARY OF THE INVENTION

The present invention has been made in consideration of the aforementioned problems, and realizes an image capturing apparatus that suppresses image blurring during magnification display of an HDR moving image and makes it easy to check the focus state, a control method thereof, and a storage medium.

In order to solve the aforementioned problems, the present invention provides an image capturing apparatus comprising: an image capturing unit configured to capture a plurality of images with different exposure amounts; an image compositing unit configured to composite the plurality of images and generate a composited image; and a display control unit configured to display the composited image generated by the image compositing unit on a display unit; wherein the display control unit performs control so that, in accordance with an instruction for magnifying a portion of the composited image displayed on the display unit, a magnified image of an image from among the plurality of images captured by the image capturing unit is displayed on the display unit instead of the composited image.

In order to solve the aforementioned problems, the present invention provides a control method of an image capturing apparatus comprising: an image capturing step of capturing a plurality of images with different exposure amounts; an image compositing step of compositing the plurality of images and generating a composited image; and a display control step of displaying the composited image generated in the image compositing step on a display apparatus; wherein in the display control step, control is performed so that, in accordance with an instruction for magnifying a portion of the composited image displayed on the display apparatus, a magnified image of an image from among the plurality of images captured in the image capturing step is displayed on the display apparatus instead of the composited image.

In order to solve the aforementioned problems, the present invention provides a non-transitory computer-readable storage medium storing a program for causing a computer to execute the control method of an image capturing apparatus having: an image capturing step of capturing a plurality of images with different exposure amounts; an image compositing step of compositing the plurality of images and generating a composited image; and a display control step of displaying the composited image generated in the image compositing step on a display apparatus; wherein in the display control step, control is performed so that, in accordance with an instruction for magnifying a portion of the composited image displayed on the display apparatus, a magnified image of an image from among the plurality of images captured in the image capturing step is displayed on the display apparatus instead of the composited image.

According to the present invention, it is possible to suppress image blurring during magnification display of an HDR moving image, and to make it easy to check the focus state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a diagram showing a timing chart during HDR moving image shooting according to the embodiment.

FIG. 5 is a flowchart showing a series of operations in magnification display processing during HDR moving image shooting according to a first embodiment.

FIG. 9 is a graph showing a method for determining an exposure amount for selecting an image based on the exposure amount during an AF operation according to the present embodiment.

DESCRIPTION OF THE EMBODIMENTS

First Embodiment

Figure 1:
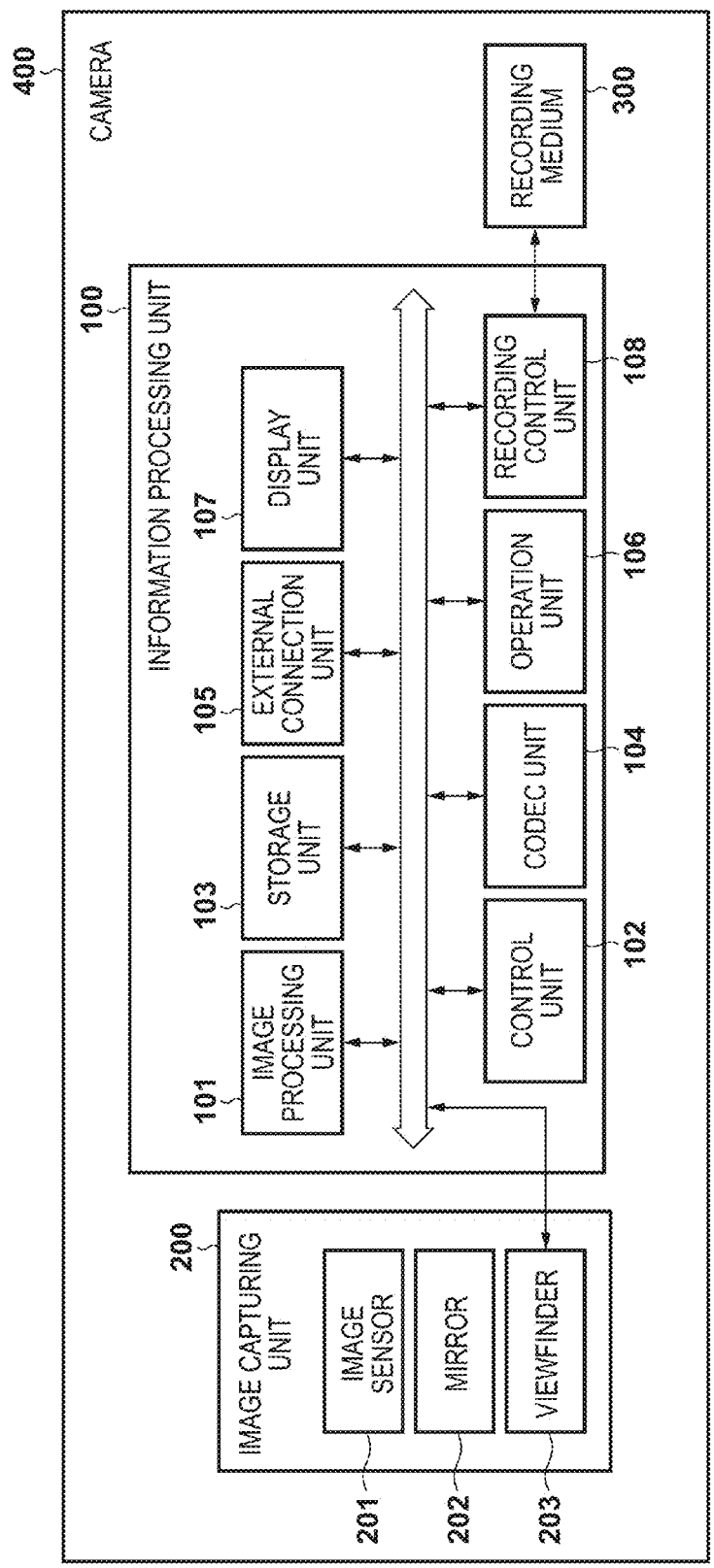
FIG. 1 is a block diagram showing an example of the function configuration of a digital camera 400 as one example of an image processing apparatus according to an embodiment of the present invention.

An exemplary embodiment of the present invention will be described below in detail with reference to drawings. Note that an example will be described below in which the present invention is applied to a digital camera, as one example of an image capturing apparatus, provided with functions of generating and live-view displaying a moving image (HDR moving image) acquired by successively performing acquisition of composited images (HDR images) using high dynamic range compositing. However, the image capturing apparatus in the present invention is not limited to digital cameras, and the present invention can also be applied to any electronic devices provided with functions of generating and live-view displaying an HDR moving image. These electronic devices may include a cellular phone, a gaming device, a tablet terminal, a personal computer, a watch-type or eyeglass-type information terminal and the like.

Configuration of Digital Camera 400

A digital camera 400 has an information processing unit 100, an image capturing unit 200, and a recording medium 300, and the information processing unit 100 performs processing such as image processing on an image captured by the image capturing unit 200, and records the image to the recording medium 300.

The information processing unit 100 has an image processing unit 101, a control unit 102, a storage unit 103, a codec unit 104, an external connection unit 105, an operation unit 106, a display unit 107, and a recording control unit 108.

The image processing unit 101 performs image processing such as pixel interpolation processing and color conversion processing on an image signal output from the image capturing unit 200. The image processing unit 101 also converts analog data read out from an image sensor 201 into digital data by performing A/D conversion, and converts the data to a data format of the YUV color space. The image processing unit 101 further performs various types of image processing, and causes the storage unit 103 to store the processed image data. The image processing unit 101 can also perform image compositing processing on a plurality of image data pieces, and can execute processing such as HDR compositing and output a composited image, for example.

The control unit 102 is a processor including a CPU (Central Processing Unit), and controls overall operations of the digital camera 400 in accordance with a computer program stored in the storage unit 103. For example, the control unit 102 controls the image capturing unit 200 and the image processing unit 101 to start shooting processing upon receiving a shooting instruction from a user via the operation unit 106. The image capturing unit 200 and the image processing unit 101 execute shooting processing including processing such as exposure processing, development processing and the like upon receiving the instruction from the control unit 102. The control unit 102 also controls the image capturing unit 200 and the image processing unit 101 to perform AF (autofocus) processing and AE (automatic exposure adjustment) processing. When the control unit 102 instructs the start of the AF processing and the AE processing, the image processing unit 101 performs computation processing regarding the focus state and the exposure state using an image signal output from the image capturing unit 200. The image capturing unit 200 and the image processing unit 101 perform TTL (through the lens) type AF processing and AE processing based on this computation result. Furthermore, the control unit 102 performs display control for performing magnification display processing, which is described later, upon receiving an instruction for display magnifying via the operation unit 106 during live view display of an HDR moving image.

The storage unit 103 is a main storage device such as a semiconductor memory, and functions as a work area of the control unit 102. The storage unit 103 also functions as a holding region for holding multiple image data pieces for generating a composited image. Note that the work area and the holding region of the control unit 102 are not limited to the storage unit 103, and may be an external recording device such as a hard disk drive, for example.

The codec unit 104 encodes image data in the YUV format that is written in the storage unit 103 into a still image in a predefined format such as the JPEG format or a lossless compression format (RAW format), and outputs the data. Conversely, it is possible to input image data in the JPEG format, a lossless compression format (RAW format), or the like to the codec unit 104, which can decode the image data into image data in the YUV format and output the data. The encoded still image is stored in the storage unit 103. The information processing unit 100 can generate a plurality of still images in different formats by causing the codec unit 104 to apply different encoding to the same YUV image data.

The external connection unit 105 performs connection control processing in the case where the digital camera 400 is connected to an external device. In the case where the digital camera 400 is connected to a personal computer by a method in compliance with USB (Universal Serial Bus) specifications, for example, a still image or the like recorded in the recording medium 300 can be transmitted to the personal computer via the external connection unit 105. Moreover, the external connection unit 105 may perform communication with an external device using wireless communication, or may transmit a video signal to a video output device such as a television.

The operation unit 106 provides a user interface used by a user to operate the digital camera 400, and notifies the control unit 102 of a detection result, operation content, or the like upon detecting the operation by the user. The operation unit 106 includes a power supply button, a mode switching dial, a release button, a cross button, a menu button, and the like for operating the digital camera 400, and each of the buttons is configured with a switch, a touch panel, or the like. For example, in magnification display processing that will be described later, the operation unit 106 determines the presence or absence of an instruction by the user operation for magnifying display during live view display of an HDR moving image, and notifies the control unit 102 of the instruction for magnifying the display. Note that the instruction for magnifying the display may include a plurality of operations such as an operation on the cross button for setting a magnification position, an operation on the touch panel, and pressing of a magnification button for starting magnification display.

The display unit 107 is configured by a display apparatus such as a liquid crystal display. In the case where the operation mode of the digital camera 400 is a shooting mode, the display unit 107 acquires, via the image processing unit 101 or the like, image signals sequentially obtained as a moving image by the image capturing unit 200 and displays the moving image, so as to realize live view display. When the user selects, via the operation unit 106, a region targeted for magnification in the live view display, a magnified image of the selected region is displayed on the display unit 107.

In the case where the operation mode of the digital camera 400 is the shooting mode, the recording control unit 108 records still image data encoded by the codec unit 104 on the recording medium 300. The recording medium 300 connected to the recording control unit 108 is a magnetic or semiconductor type of auxiliary storage device, and may be a removable medium or a storage region built in the digital camera 400.

The image sensor 201 includes an image sensor that converts the optical image of an object that enters via a lens unit (not illustrated) into an electrical signal to acquire an image signal, and the image sensor may be a CCD or CMOS image sensor, for example.

A mirror 202 moves the optical image of the object that enters via the lens unit to a position leading to the image sensor 201 or a viewfinder 203.

The viewfinder 203 is an optical finder, and enables visual checking of the optical image of the object that enters via the lens unit.

Overview of Operations of Function Blocks in HDR Moving Image Shooting

Operation timings of the function blocks when realizing an HDR moving image with the digital camera 400 will be described with reference to the timing chart shown in FIG. 2. The timing chart shows a series of operations from HDR-compositing two images shot with different exposure amounts and generating a moving image using the composited images as moving image frames to displaying the moving image on the display unit 107. In FIG. 2, the horizontal axis represents time, and a state where the function blocks perform processing at respective predetermined times is shown. A state where HDR moving image shooting is started at a time T0 and a second composited image is displayed by a time T50 is shown.

At the time T0, the control unit 102 sets an exposure amount A1 for the image capturing unit 200.

At T10, the image capturing unit 200 starts image capturing 1 with the set the exposure amount A1, and then ends the image capturing 1 at T11. Then, at T11, the image processing unit 101 starts image processing 1 on the image signal captured during the image capturing 1, and then ends the processing at T12. At T12, the storage unit 103 performs image holding 1 on the image data generated during the image processing 1 in order to composite the next captured image and that image data. The series of operations from T10 to T13 brings about a state where the first image data for generating a composited image constituting the HDR moving image is held in the storage unit 103.

At T13, the control unit 102 sets an exposure amount B1, which is different from the exposure amount A1, for the image capturing unit 200. Next, at T20, the image capturing unit 200 starts image capturing 2 with the set exposure amount B1, and then ends the processing at T21. At T21, the image processing unit 101 starts image processing 2 on the image signal captured during the image capturing 2, and then ends the processing at T22. Furthermore, at T22, the image processing unit 101 reads out the image data (image holding 1) shot with the exposure amount A1 from the storage unit 103, starts compositing processing 1 on the image data of the image capturing 2 shot with the exposure amount B1, and then ends the processing at T23. At T23, the display unit 107 starts display of the composited image that has been composited.

By compositing the images of the image capturing 1 and the image capturing 2 shot with two different exposure amounts (A1 and B1) respectively in this manner, it is possible to acquire an HDR image having a dynamic range broader than the dynamic range acquired in one shooting operation.

Next, at T23, the control unit 102 sets an exposure amount A2 for the image capturing unit 200. Here, the value of the exposure amount A2 does not necessarily have to be the same as the value of the exposure amount A1 set at T0. From T30 onward, by repeatedly and successively carrying out the above processing from the times T10 to T23, it is possible to realize the HDR moving image generated by displaying HDR images successively.

Problems with Display of Image Acquired by HDR Moving Image Shooting

Furthermore, problems when displaying the image acquired by the HDR moving image shooting will be described with reference to FIGS. 3A to 3D.

Figure 3A:
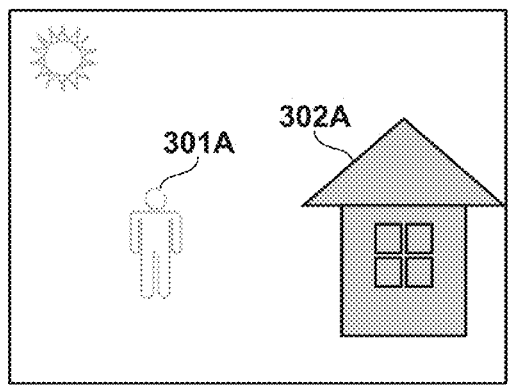
FIGS. 3A to 3D are diagrams for schematically illustrating examples of display using respective exposure settings in a conventional technology.
Figure 3B:
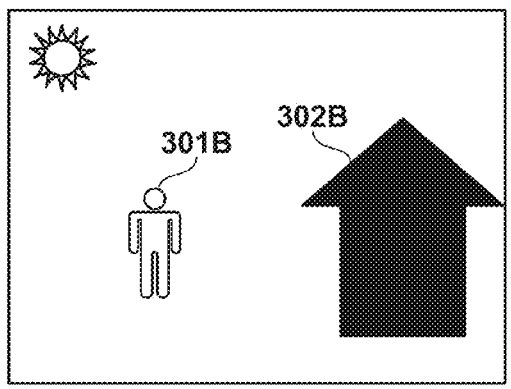

FIGS. 3A and 3B each show an image generated using a single exposure amount before the HDR compositing, that is, an image to be used for the HDR compositing. Here, the image in FIG. 3B has been shot with a lower exposure amount than the exposure amount used for the image in FIG. 3A.

An object 301 exists in a relatively bright scene in the angle of view, and blown-out highlights are caused by the excessive exposure amount in the high exposure image in which the exposure amount was set to be higher than an appropriate exposure (301A), but the exposure amount is appropriate in the low exposure image in which the exposure amount was set to be lower than the appropriate exposure (301B). On the other hand, an object 302 exists in a relatively dark scene in the angle of view, and the exposure is appropriate in the high exposure image (302A), but crushed blacks are caused by the insufficient exposure amount in the low exposure image (302B).

Figure 3C:
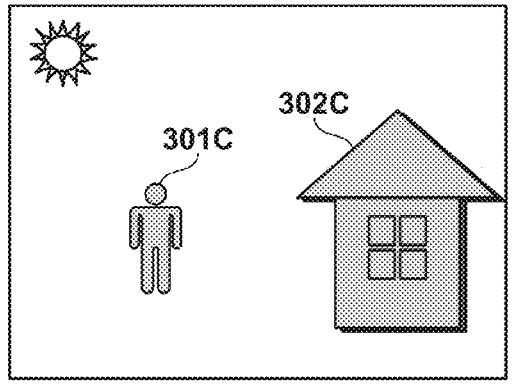

FIG. 3C is an HDR image generated by compositing the above images in FIG. 3A and FIG. 3B. Here, the blown-out highlights and the crushed blacks are respectively reduced in 301C and 302C by compositing the images so that the portions with an appropriate exposure in the high exposure image and the low exposure image are dominant.

Figure 3D:
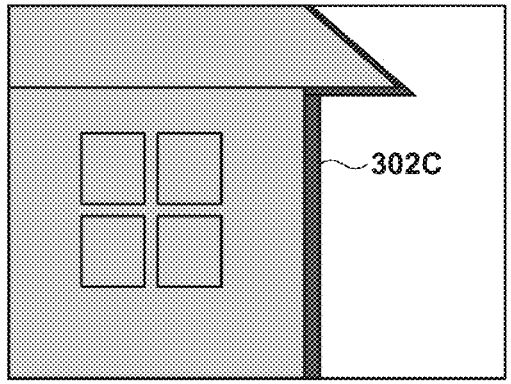

However, when the object position in the angle of view in the two images to be composited shifts during shooting due to a camera shake, an object shake when the object moves, or the like, there is a problem in that the object image in the composited image is blurred. FIG. 3D shows a magnified image of a portion of the object 302 in the composited image shown in FIG. 3C. Magnifying and displaying 302C after the HDR compositing makes the object blurring conspicuous (for example, a shade portion shown in a contour portion of 302C). That is, even in the case where the blurring of the object is less conspicuous in the full screen view in FIG. 3C, magnifying makes the blurring conspicuous in some cases. Then, in some cases, an inconvenience arises in that checking of the focus state cannot be appropriately performed due to this blurring of the object, when attempting to check the focus state using magnification display in a state where the focus is on the object, for example.

Overview of Magnification Display Processing During HDR Moving Image Shooting

Next, processing when switching from full screen display of an HDR moving image to magnification display of an image with a single exposure will be described with reference to FIGS. 4A, 4B and 5.

Figure 4A:
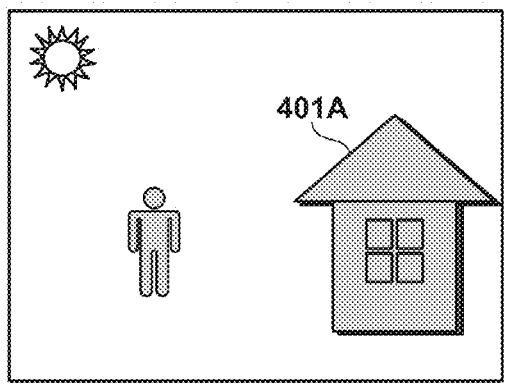
FIGS. 4A and 4B are diagrams for schematically illustrating examples of display using respective exposure settings in the embodiment.

FIG. 4A shows an image generated by HDR-compositing a plurality of images shot with varied exposure amounts. Here, an object 401A is displayed with blurring due to a cause such as a camera shake.

Figure 4B:
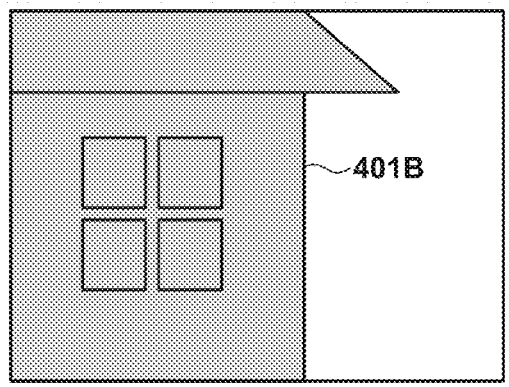

On the other hand, FIG. 4B shows an image acquired by magnifying and displaying the object 401A in order to check the focus state thereof. In order to reduce the object blurring that occurred in the full screen display in FIG. 4A, an image of a single exposure amount shot with a certain exposure amount, not an HDR-composited image, is displayed as an image shown in this magnification display. Here, a state is shown in which the high exposure image is selected, but the low exposure image may be selected. For example, the image that will be the most dominant in the region of the magnification display when performing the HDR compositing (here, the high exposure image) is selected and displayed.

Series of Operations of Magnification Display Processing in HDR Moving Image Shooting Next, a series of operations regarding magnification display processing in the HDR moving image shooting will be described with reference to FIG. 5. Note that when an instruction for starting the moving image shooting is notified to the control unit 102 via the release button, the mode switching dial, or the like of the operation unit 106, this processing is started. In the flowchart in FIG. 5, the processing of each step is, unless especially stated otherwise, realized by the control unit 102 expanding a control program to the work area of the storage unit 103 and executing the program.

In step S301, when the control unit 102 receives an HDR mode setting for the moving image shooting via the operation unit 106, the information processing unit 100 and the image capturing unit 200 perform setting of function blocks in order to execute the HDR moving image capturing described with reference to FIG. 2.

In step S302, the control unit 102 determines whether or not a display start request for live view display exists. When a notification of the display start request has been received via the operation unit 106, the control unit 102 advances the procedure to step S303 in order to perform the live view display. On the other hand, when it is determined that the notification of the display start request has not been received, the procedure is returned to step S302.

In step S303, the control unit 102 performs full screen display of an HDR image on the display unit 107. The control unit 102 performs control such that the HDR image is input to the display unit 107, which then displays the entire image.

In step S304, the control unit 102 determines whether or not a request for display end has been received via the operation unit 106 during the full screen display, and advances the procedure to step S309 when it is determined that the request for display end has been received. When it is determined that the request has not been received, the procedure is advanced to step S305 in order to determine whether or not an additional display request exists while continuing the full screen display.

In step S305, the control unit 102 determines whether or not a request for magnification display of live view display has been received via the operation unit 106. When a notification using a touch panel, an operation button, or the like of the operation unit 106 has been received and it is determined that the request for magnification display has been received, the control unit 102 advances the procedure to step S306 in order to switch the display. On the other hand, when it is determined that the request for magnification display has not been received, the procedure is returned to step S304, and the full screen display of the HDR moving image is continued.

In step S306, the control unit 102 controls the display unit 107 to perform the magnification display of an image of a single exposure amount, not the HDR image. The control unit 102 designates, for the image processing unit 101, a region of the image to be used for the magnification display, and controls the image processing unit 101 to output an image generated by magnifying a portion of the image of the single exposure amount. The image processing unit 101 cuts out the designated region from the image of the single exposure amount, magnifies the region, and outputs the region together with the HDR image to the storage unit 103, in accordance with an instruction from the control unit 102. Here, the image processing unit 101 selects the image of a single exposure amount that will be the most dominant in the region of the magnification display when performing the HDR compositing, for example, and performs the cutting out processing. The display unit 107 reads out the image to be used for the magnification display from the storage unit 103 and displays the image, in accordance with the instruction from the control unit 102.

In step S307, the control unit 102 determines whether or not a request for display end has been received via the operation unit 106 during the magnification display, and advances the procedure to step S308 in order to continue the display when it is determined that the request for display end has not been received. On the other hand, when it is determined that the request for display end has been received, the procedure is advanced to step S309 in order to end the display.

In step S308, the control unit 102 determines whether or not a request for full screen display has been received via the operation unit 106 during the magnification display, and returns the procedure to step S303 in order to cause the display unit 107 to perform the full screen display of the HDR image again, when it is determined that the request for full screen display has been received. On the other hand, when it is determined that the request for full screen display has not been received, the procedure is returned to step S307 and the magnification display is continued.

In step S309, the control unit 102 ends the live view display, and ends the series of operations regarding this processing.

Note that in the present embodiment, an example was described in which only two images, which are the high exposure image and the low exposure image, were used to perform the HDR compositing, and either the high exposure image or the low exposure image is displayed as the magnification display. However, the present invention is also realized by using two or more images with varied exposure amounts to perform the HDR compositing, and performing the magnification display using any image among these images.

Moreover, in the present embodiment, moving image shooting using HDR-composited images as frames was described as an example, but the present invention may also be applied to the case where still images (namely, HDR images) are generated at intervals of about several seconds to several tens of minutes, such as time lapse shooting (also referred to as interval shooting).

Furthermore, in the present embodiment, an example was described in which the digital camera 400 performs shooting of the HDR moving image and performs the magnification display on the display unit 107. However, the present invention can also be applied to the case where an image capturing apparatus is operated by a communication terminal or an image processing apparatus, for example. That is, a configuration may be adopted in which the communication terminal or the image processing apparatus sequentially acquires images of a single exposure amount shot by the image capturing apparatus so as to generate an HDR moving image, and performs the above-described magnification display of images of a single exposure amount. Thereby, the focus state can be checked using the magnification display when operating an image capturing apparatus capable of shooting with different exposure amounts from a communication device or the like such as a smart phone. In this case, the above requests include a command received from the outside and an instruction of an operation input from an operation unit.

As described above, in the present embodiment, in the case of performing magnification display in live view display, images of a single exposure amount that have not been subjected to HDR-compositing are displayed. Thereby, even in the case where an object position in the angle of view in two images to be composited shifts due to a camera shake, an object shake when the object moves, or the like, it is possible to more precisely check the focus state using a magnified image. Therefore, it is possible to suppress the blurring of the image during the magnification display of an HDR moving image, and easily check the focus state.

Second Embodiment

Next, a second embodiment will be described. In the second embodiment, magnification display processing is performed by selecting an image of a single exposure amount in accordance with the luminance of a region targeted for magnification. Accordingly, the magnification display processing in the HDR moving image shooting in the present embodiment is different from that in the first embodiment, but other configurations are the same as those in the first embodiment. Accordingly, the same reference signs are assigned to the same configurations and steps so as to omit redundant description, and mainly the differences will be described.

Figure 6:
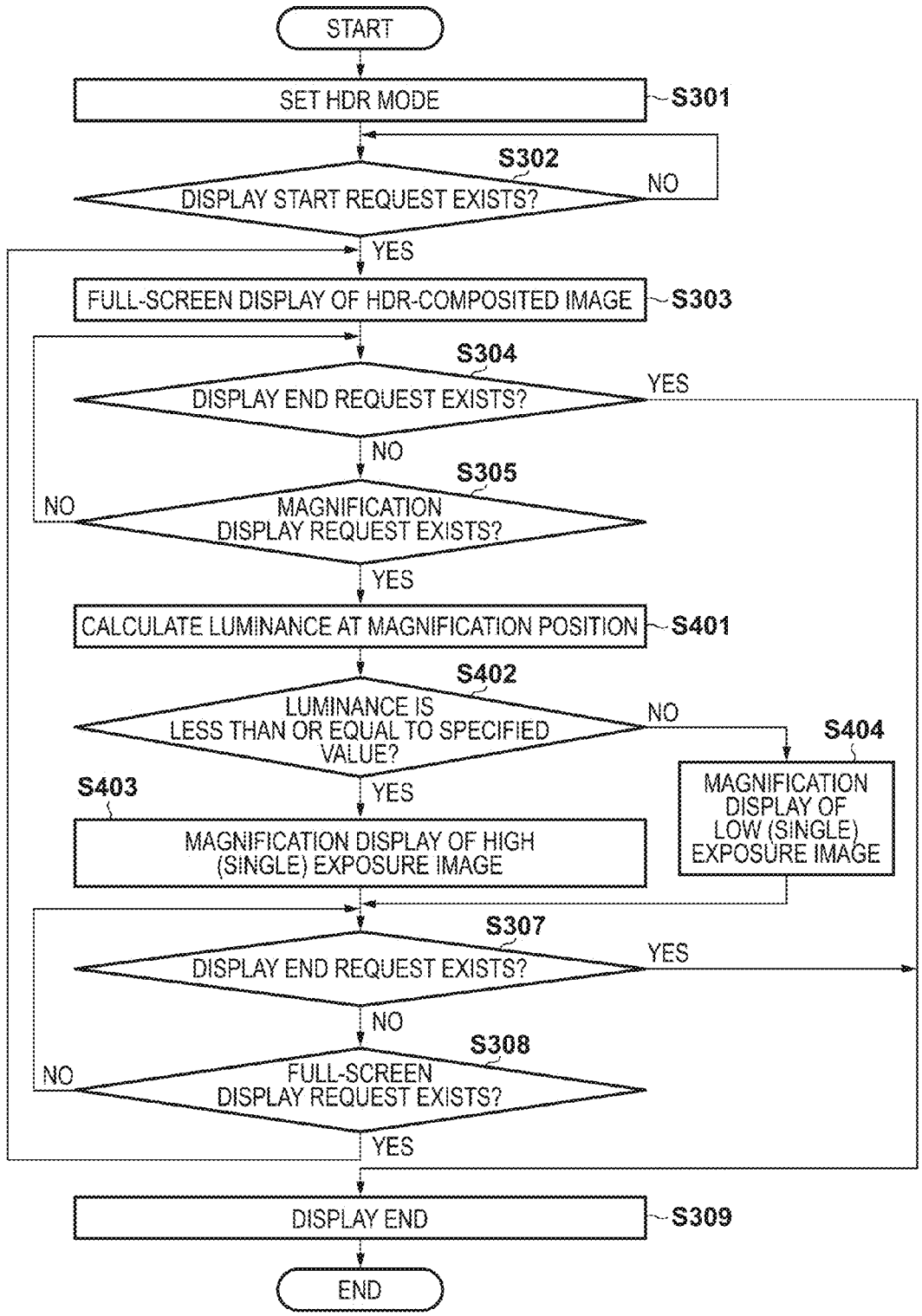
FIG. 6 is a flowchart showing a series of operations in magnification display processing during HDR moving image shooting according to a second embodiment.

The magnification display processing in the HDR moving image shooting according to the present embodiment will be described below with reference to FIG. 6.

First, the processes of steps S301 to S305 described in the first embodiment with reference to FIG. 5 are performed.

In step S401, the control unit 102 calculates the luminance at a position for performing the magnification display in response to reception of a request for magnification display via the operation unit 106 during full screen display. The signal level of a pixel at a magnification display position in an image formed by the image capturing unit 200 may be used, or a value measured by a dedicated luminance sensor (not illustrated in FIG. 1) may be used. At this time, it is sufficient that the signal of the pixel at the magnification display position output from the image capturing unit 200 is a luminance acquired or measured at the magnification display position, regardless of the case where a high exposure image is acquired or the case where a low exposure image is acquired.

In step S402, the control unit 102 determines whether or not the luminance value calculated in step S401 is less than or equal to a predetermined specified value (threshold). In the case where the calculated luminance value is less than or equal to the predetermined specified value, the control unit 102 advances the procedure to step S403 and performs the magnification display using a high exposure image. On the other hand, in the case where the calculated luminance value is greater than the predetermined specified value, the control unit 102 advances the procedure to step S404 and performs the magnification display using a low exposure image. At this time, it is sufficient that the predetermined specified value is determined from experiments or the like in advance for the signal level obtained at the time of acquiring the high exposure image (or the low exposure image), read out from a ROM (not illustrated), and used. Moreover, the predetermined specified value may be dynamically determined in accordance with the exposure amounts of a plurality of images constituting the HDR image used for the full screen display, instead of setting this value as a fixed value.

Subsequently, the processes of steps S307 to S309 described with reference to FIG. 5 are performed, and then this series of processes is ended.

As described above, in the present embodiment, an image of a single exposure amount that has not been subjected to the HDR compositing is displayed in the case of performing the magnification display in live view display, and selection of the image of the single exposure amount is made in accordance with the luminance value at the magnification position. Thereby, the focus state can be more accurately checked using a magnified image, and furthermore, an image with an exposure amount more suitable for display can be selected from among images of a single exposure amount and displayed.

Third Embodiment

Next, a third embodiment will be described. In the third embodiment, in the case of switching from full screen display of an HDR moving image to magnification display, display of an image of a single exposure amount or display of an HDR image during the magnification is selected depending on the presence or absence of an operation for controlling the focus position (for example, AF operation), and the magnification display processing is performed.

Accordingly, the magnification display processing in HDR moving image shooting in the present embodiment is different from that in the first and second embodiments, but other configurations are the same as those of the first embodiment. Accordingly, the same reference signs are assigned to the same configurations and steps so as to omit redundant description, and mainly differences will be described.

Figure 7:
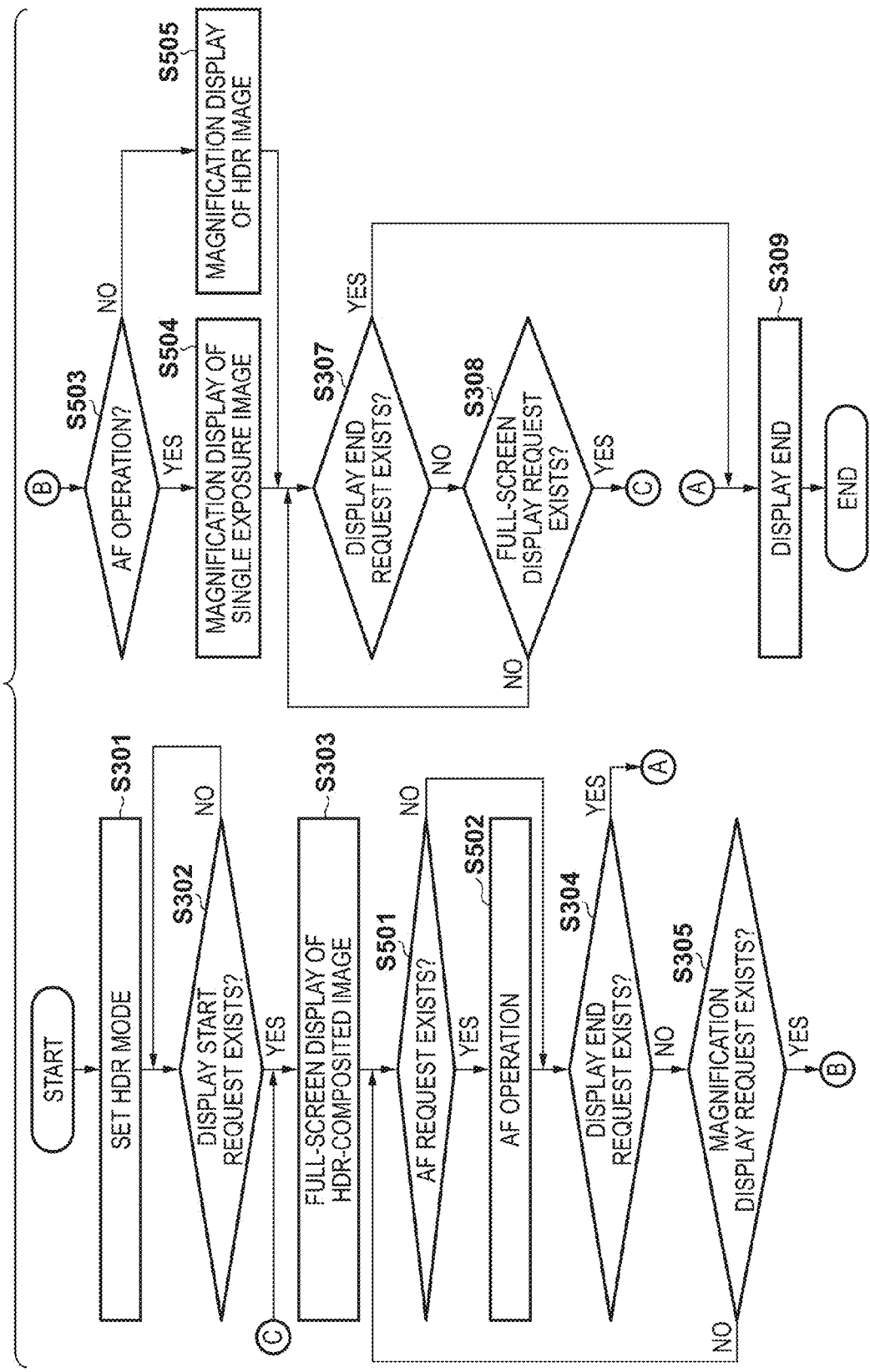
FIG. 7 is a flowchart showing a series of operations in magnification display processing during HDR moving image shooting according to a third embodiment.

The magnification display processing in the HDR moving image shooting according to the present embodiment will be described below with reference to FIG. 7.

First, the processes of steps S301 to S303 described in the first embodiment with reference to FIG. 5 are performed.

Next, in step S501, the control unit 102 determines whether or not an AF request has been received. The control unit 102 determines the presence or absence of an operation indicating an AF request such as half-pressing of the release button based on a notification from the operation unit 106. In the case where it is determined that an AF request has been received, the control unit 102 advances the procedure to step S502 in order to perform an AF operation, and on the other hand, in the case where it is determined that an AF request has not been received, the procedure is advanced to step S304 without performing the AF operation.

In step S502, the image processing unit 101 and the image capturing unit 200 perform the AF operation in accordance with an instruction from the control unit 102. For example, the image processing unit 101 performs computation based on a blurring amount of the image output from the image capturing unit 200, and outputs a control amount for controlling the focus position based on the calculated computation amount to the image capturing unit 200. The image capturing unit 200 controls a focusing lens based on the acquired control amount. The image processing unit 101 and the image capturing unit 200 may repeat acquisition of images shot with varied focus positions and output of the control amount while performing the processing of this flowchart, until an optimum focus state in a predetermined AF frame is acquired.

Next, the processes of steps S304 and S305 described in the first embodiment with reference to FIG. 5 is performed, and a request for magnification display during full screen display is controlled.

In step S503, the control unit 102 determines whether or not an AF operation is being performed. In the case where it is determined that an AF operation is being performed, the procedure is advanced to step S504 in order to display a magnified image using an image of a single exposure amount, and on the other hand, in the case where it is determined that an AF operation is not being performed, the procedure is advanced to step S505 in order to display a magnified image using an HDR image. Determination of whether or not an AF operation is being performed is made by, for example, a method in which the control unit 102 monitors a state of an AF operation being actually performed, a method for determining that an AF operation is being performed within a predetermined period of time from the time when the AF operation was started, or the like. For example, the control unit 102 gives an instruction for an AF operation to the image capturing unit 200 and the image processing unit 101, and determines that the AF operation is being performed from this time point until reception of a notification informing the completion of the operation from the image processing unit 101 or the like, or until a certain period of time elapses.

In step S504, in the case where an AF operation is being performed, the display unit 107 displays an image of a single exposure amount and performs magnification display. In the case where it is determined that an AF operation is being performed, the control unit 102 performs magnification display using a predefined image of a single exposure amount, such as a high exposure image. Moreover, in step S505, in the case where an AF operation is not being performed, the display unit 107 displays an HDR image and performs the magnification display. In the case where blurring between a high exposure image and a low exposure image is increased due to an AF operation being performed in this manner, blurring can be reduced by displaying an image of a single exposure amount in the magnification display.

Subsequently, the processes of steps S307 to S309 described with reference to FIG. 5 are performed, and this series of processes is ended.

Note that the method for determining an AF operation in step S503 which was described in the present embodiment is exemplary, and the determination of an AF operation may be performed using other methods. For example, the control unit 102 may monitor a user operation on the release button, and determines that an AF operation is being performed in the case where a half-pressing state of the release button by the user operation continues. Moreover, in the case where it is determined that an AF operation is being performed from the start of the AF operation until after a certain period of time elapses, the certain period of time may be able to be set by a user via the operation unit 106. Thereby, it is possible to set a time period when magnification display can be performed using an image of a single exposure amount in accordance with a user's use state.

In the present embodiment, magnification display during an AF operation was described, but the operations in an image capturing apparatus are not limited to the AF operation (that is, an operation of controlling the focus position). The present invention can be applied to any operation that causes blurring of an object at different times when capturing a plurality of images (high exposure images and low exposure images) used for generating an HDR image, such as a zooming operation.

As described above, in the present embodiment, the focus state can be checked in a state where object blurring is reduced by displaying an image of a single exposure amount in magnification display during an AF operation. Also, in magnification display after an AF operation is completed or an AF operation is not being performed, the focus state can be checked by magnifying and displaying the result of the HDR compositing by displaying the HDR image.

Fourth Embodiment

Next, a fourth embodiment will be described. The present embodiment is similar to the third embodiment in that, in the case of switching from full screen display of an HDR moving image to magnification display, whether display of a single exposure amount image is performed or display of an HDR image is performed in the magnification display is selected depending on presence or absence of an AF operation. However, the present embodiment is different from the third embodiment in that selection of an image in the case of displaying an image of a single exposure amount for magnification display is further controlled in accordance with an exposure amount during an AF operation. Accordingly, the magnification display processing in the HDR moving image shooting in the present embodiment is different from that in the first to third embodiments, but other configurations in the present embodiment are the same as those in the first embodiment. Accordingly, the same reference signs are assigned to the same configurations and steps so as to omit redundant description, and mainly differences will be described.

Figure 8:
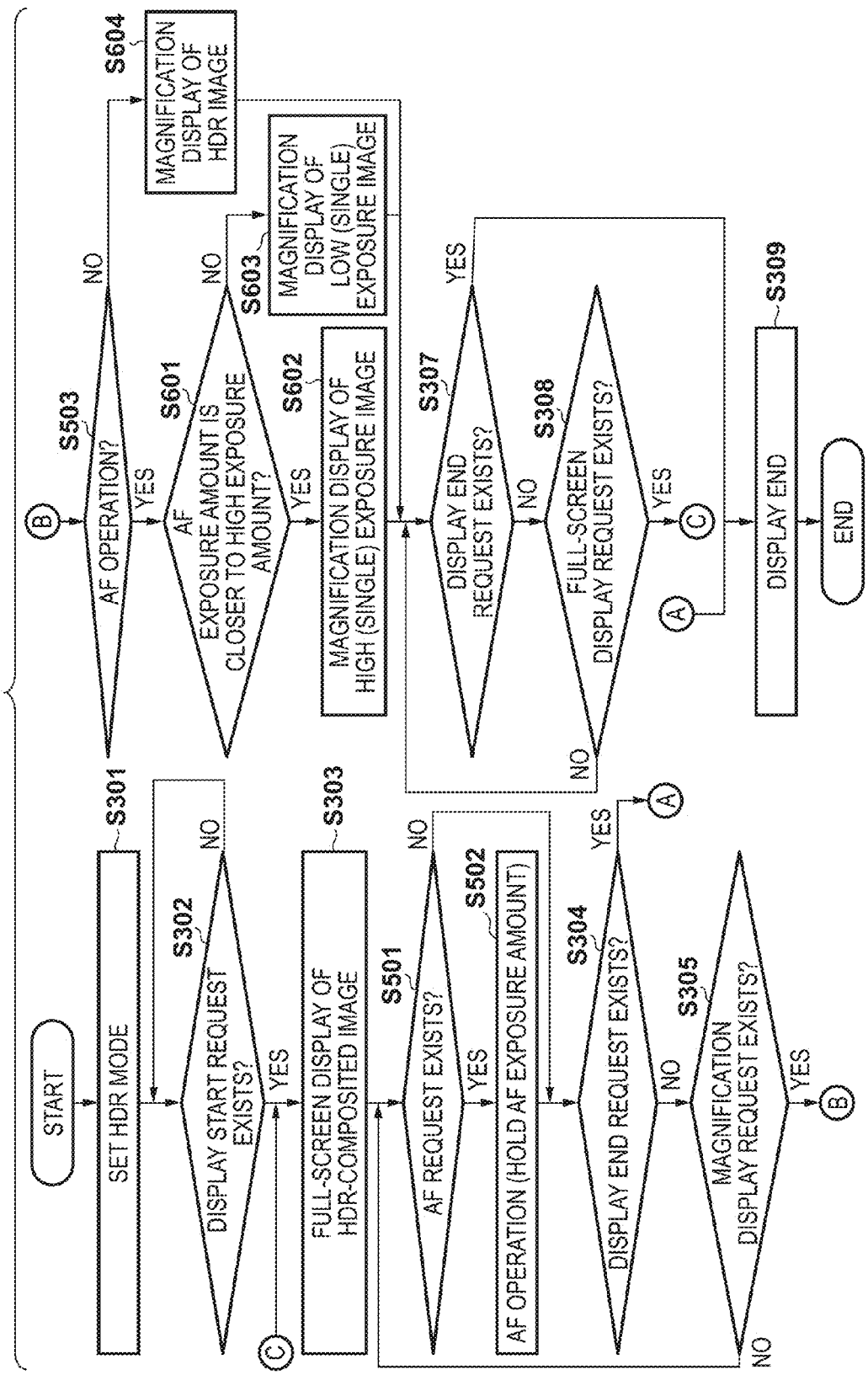
FIG. 8 is a flowchart showing a series of operations in magnification display processing during HDR moving image shooting according to a fourth embodiment.

The magnification display processing in the HDR moving image shooting according to the present embodiment will be described below with reference to FIG. 8.

First, the processes of steps S301 to S303 and steps S501 to S502 described in the above embodiment are performed. At this time, in the case where it is determined in step S501 that an AF request has been received and an AF operation is performed in step S502, the control unit 102 causes the storage unit 103 to store an exposure amount that was set during the AF operation. At this time, as the exposure amount that was set during the AF operation, an exposure amount equal to that for a high exposure image or that for a low exposure image constituting an HDR image may be used, or another optimum exposure amount for performing AF may be calculated and used.

Furthermore, the processes of steps S304 to S305 and step S503 described in the above embodiment are performed. At this time, it is determined in step S503 whether or not an AF operation is being performed, and in the case where it is determined that an AF operation is not being performed, the procedure is advanced to step S604 in order to perform magnification display using an HDR image. On the other hand, in the case where it is determined that an AF operation is being performed, the procedure is advanced to step S601 in order to select an image of a single exposure amount.

In step S601, the control unit 102 reads out information indicating an exposure amount during an AF operation, which is held in the storage unit 103, and determines whether the exposure amount during the AF operation is closer to the exposure amount used when shooting the high exposure image or that used when shooting the low exposure image. In the case where it is determined that the exposure amount during the AF operation is closer to the exposure amount used when shooting the high exposure image, the control unit 102 advances the procedure to step S602 in order to select the high exposure image as the image of the single exposure amount that is to be displayed. On the other hand, in the case where it is determined that the exposure amount during the AF operation is closer to the exposure amount used when shooting the low exposure image, the control unit 102 advances the procedure to step S603 in order to select the low exposure image as the image of the single exposure amount that is to be displayed. Note that a more concrete example of a determination method in this step will be described later with reference to FIG. 9.

In step S602, the control unit 102 selects the high exposure image as the image of the single exposure amount that is to be displayed, and causes the display unit 107 to display the image. Moreover, in step S603, the control unit 102 selects the low exposure image as the image of the single exposure amount and causes the display unit 107 to display the image.

When the magnification display is performed, the control unit 102 performs the processes of steps S307 to S309 described in the above embodiment, and then ends this series of processes.

Here, a concrete example of the determination method in step S601 in the present embodiment will be described with reference to FIG. 9.

It is assumed that there is an exposure amount Y1 used when shooting a high exposure image and an exposure amount Y2 used when shooting a low exposure image, and that the intermediate value between the amounts Y1 and Y2 is Ym=(Y1+Y2)/2.

At this time, in the case where an exposure amount Ya that was set during the AF operation is greater than or equal to the intermediate value Ym, the magnification display of the image of the single exposure amount is performed using the high exposure image (step S602), and in the case where the exposure amount Ya is less than the intermediate value Ym, the magnification display of the image of the single exposure amount is performed using the low exposure image (step S603). Note that in the example in FIG. 9, because the exposure amount Ya during the AF operation is greater than or equal to the intermediate value Ym, the high exposure image is selected and magnification display is performed.

As described above, in the present embodiment, in the case of displaying an image of a single exposure amount, a magnified image suitable for focus check can be displayed even during the AF operation by selecting, based on the exposure amount set during the AF operation, the single exposure amount image that is to be displayed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211993, filed Oct. 16, 2014, which is hereby incorporated by reference herein in its entirety.

What is claimed is:
1. An image capturing apparatus comprising:
    an image capturing unit configured to capture a plurality of images with different exposure amounts;

an image processor configured to composite the plurality of images and generate a composited image; and a display control unit configured to display the composited image generated by the image processor on a display unit;

wherein, upon receiving an instruction for magnification a portion of the composited image displayed on the display unit, the display control unit displays the magnified image of an image from among the plurality of images in a case where the image capturing apparatus is performing a predetermined operation, and magnifies and displays a portion of the composited image in a case where the image capturing apparatus is not performing the predetermined operation.

2. The apparatus according to claim 1, wherein the display control unit selects an image from among the plurality of images based on luminance of a region targeted for magnification in an image from among the plurality of images, and magnifies and displays the selected image.

3. The apparatus according to claim 1, wherein in a case of displaying the magnified image of an image from among the plurality of images, the display control unit selects an image from among the plurality of images based on an exposure amount that was set when the image capturing apparatus performed the predetermined operation, and magnifies and displays the selected image.

4. The apparatus according to claim 3, wherein the display control unit selects, from among the plurality of images, an image that was shot with a exposure amount that is closest to the exposure amount that was set when the image capturing apparatus performed the predetermined operation.

5. The apparatus according to claim 1, wherein the predetermined operation of the image capturing apparatus is an operation of controlling a focus position.

6. The apparatus according to claim 1, wherein the image capturing unit repeats capturing of the plurality of images for each frame constituting a moving image, and the image processor generates an image with an expanded dynamic range by compositing the plurality of images for each of the frames.

7. The apparatus according to claim 5, further comprising:

an input unit configured to accept an instruction for starting the operation of controlling the focus position by a user operation, wherein, upon receiving the instruction for magnification, the display control unit determines that the operation for controlling the focus position is being performed in a case where input to the input unit is continuing, and determines that the operation for controlling the focus position is not being performed in a case where input to the input unit is not continuing.

8. The apparatus according to claim 5, wherein the display control unit displays the magnified image of an image from among the plurality of images in a case where the instruction for magnification is received during a predetermined period of time from a start of the operation of controlling the focus position.

9. The apparatus according to claim 1, further comprising:

a determination unit configured to determine presence or absence of the instruction for magnification by a user operation.

10. A control method of an image capturing apparatus comprising:

an image capturing step of capturing a plurality of images with different exposure amounts;

an image compositing step of compositing the plurality of images and generating a composited image; and a display control step of displaying the composited image generated in the image compositing step on a display apparatus;

wherein in the display control step, upon receiving an instruction for magnification a portion of the composited image displayed on the display apparatus, displaying the magnified image of an image from among the plurality of images in a case where the image capturing apparatus is performing a predetermined operation, and magnifying and displaying a portion of the composited image in a case where the image capturing apparatus is not performing the predetermined operation.

11. A non-transitory computer-readable storage medium storing a program for causing a computer to execute the control method of an image capturing apparatus having:

an image capturing step of capturing a plurality of images with different exposure amounts;

an image compositing step of compositing the plurality of images and generating a composited image; and a display control step of displaying the composited image generated in the image compositing step on a display apparatus;

wherein in the display control step, upon receiving an instruction for magnification a portion of the composited image displayed on the display apparatus, displaying the magnified image of an image from among the plurality of images in a case where the image capturing apparatus is performing a predetermined operation, and magnifying and displaying a portion of the composited image in a case where the image capturing apparatus is not performing the predetermined operation.

* * * * *